L. P. JUVET.
Time Globe.

No. 9,702. Reissued May 10, 1881.

Witnesses.
Franck L. Durand
Jacob Fellbel

Inventor.
Louis P. Juvet.
By atty.
J. V. McIntire

N. PETERS, Photo-Lithographer, Washington, D. C.

2 Sheets—Sheet 2.

L. P. JUVET.
Time Globe.

No. 9,702. Reissued May 10, 1881.

Witnesses
F. L. Durand
Jacob Felbel.

Inventor
Louis P. Juvet.

By atty.
J. V. McIntire.

N. PETERS, Photo-Lithographer, Washington, D. C.

UNITED STATES PATENT OFFICE.

LOUIS PAUL JUVET, OF GLENS FALLS, NEW YORK.

TIME-GLOBE.

SPECIFICATION forming part of Reissued Letters Patent No. 9,702, dated May 10, 1881.

Original No. 64,989, dated May 21, 1867; Reissue No. 8,666, dated April 8, 1879. Application for reissue filed April 12, 1881.

*To all whom it may concern:*

Be it known that I, LOUIS PAUL JUVET, of Glens Falls, in the county of Warren and State of New York, have invented a new and Improved Time-Globe; and I do declare that the following is a full and exact description of the same, reference being had to the accompanying drawings, making a part of this specification, in which like parts are indicated by like letters in the several figures.

My invention consists in the combination, with the terrestrial globe having a chronometer-movement within it, of a dial located at or near one of the poles, all as will be hereinafter more fully explained; and my invention further consists in the combination, with the globe, of an axially-arranged shaft composed of two parts, one of which serves as a stationary shaft, upon which may turn two concentrically-arranged sleeves, that carry, respectively, the hour and minute hands of the clock, and the other of which serves as a winding-arbor to the clock, all as will be hereinafter more fully explained; and my invention further consists in the combination, with the globe and a clock mechanism therein contained, of a regulator and means for operating it from without the globe, all as will be hereinafter more fully explained.

To enable others skilled in the art to make and use my invention, I will proceed to more fully describe its construction and operation by reference to the accompanying drawings, in which—

Figure 1:
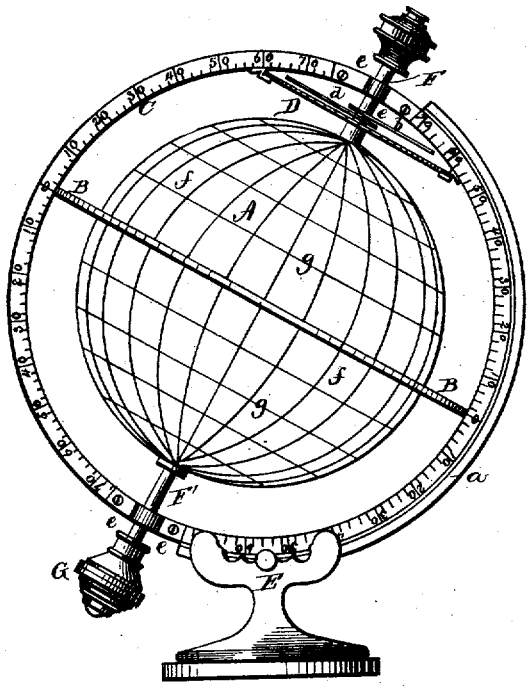
Figure 2:
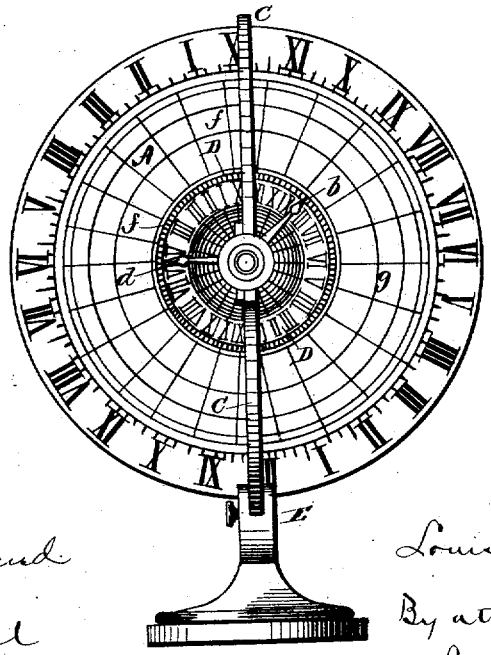
Figure 3:
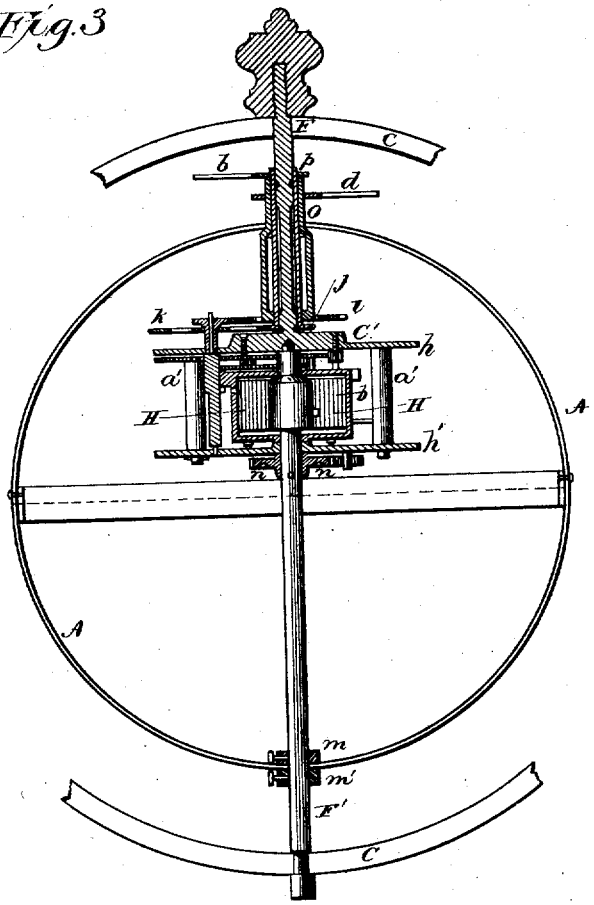
Figure 4:
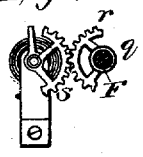

Figure 1 is a side view of my revolving globe. Fig. 2 is a front view or elevation, the axis being horizontal. Fig. 3 is an axial section of the works and globe, and Fig. 4 is a detail view of the regulator.

A represents a hollow globe made of two hemispherical sections united at the equator, and there properly fitted and secured together, as will hereinafter be described.

B is an equatorial dial.

C is a meridian-ring supporting the axis of the globe, and also a dial, D, near one of the poles. The dial B is also secured to said ring. The meridian-ring C slides in a standard, E, by means of a groove, *a*, and corresponding mechanical fitting. This ring is divided into degrees, so as to regulate the inclination of the axis of the globe at pleasure, at the same time indicating latitude.

*b* and *d* are clock-hands, operated by the works inside of the globe, and indicating the time on dial D, the same as on the dial of a clock or watch. This dial is, however, marked from 1 to 12 twice, since the globe revolves once in twenty-four hours. The hands move to the left. If the dial were at the other pole they would, however, move to the right. The aim is to make the globe revolve in the direction our earth does, and I therefore prefer having the dial at the north pole.

F F′ represent the axis on which the globe revolves. G is a thumb-piece attached to the lower end of shaft F′, by which to turn said shaft, and thus wind the chronometer inside of the globe. The axis F F′ is mounted on the meridian-ring C by means of two bearing-boxes, *e e*.

*f* indicates the longitudinal lines on the globe, and *g* those of latitude.

The works used in the construction of my time-globe, as seen in Fig. 3, are composed of two plates, *h h′*, united by pillars *a′*. Between the plates, and at their centers, is the barrel-wheel H, containing the mainspring *b′*, that imparts motion to a train of wheels and pinions, said motion being regulated by a "patent lever" or any other escapement capable of running in different positions.

The barrel-wheel arbor F′ is made of suitable length to extend through the plate *h′* of the globe A and the meridian-ring C, and receive the thumb-piece G, by means of which the mainspring *b′* is wound up from the outside without detaching the sections of the globe and without the use of a special key.

The ratchet-wheel *n* is secured to the arbor below the plate *h′*.

Upon the plate *h* and concentric with the barrel-wheel arbor the flange *c′* of the arbor F is secured by screws. This arbor is also secured by screws or otherwise to the meridian-circle C, thus rendering the works of the chronometer stationary within the globe. On and around this arbor F are two wheels, *i* and *j*, receiving their motions from the double wheel *k*, and these are so calculated as to make the wheel *j* revolve once in two hours, being the one hundred and twenty minutes of the dial D, and the wheel *i* one revolution in twenty-four hours, their respective motions being transmitted by a prolongation of their arbors *p* and *o* to the globe A, and to the two hands *b* and *d* of the dial D, these two hands being secured by hard friction to the upper ends of their respective arbors. With a slight alteration in the number of teeth of these wheels the dial D could be made with twelve hours only instead of twenty-four, at the option of the constructor.

The two hemispherical sections, divided at the equator, should be of equal weight, in order to obtain a regular motion of rotation. They are fastened together by means of an inside ring, *l*, which is attached to one of the sections, and over which the other is adjusted and secured by means of little screws, four or more.

An aperture is made at one of the poles of the globe of proper size to accommodate the axis F′, on which it must revolve. At the other pole the aperture is made to fit the end of the arbor *o* of the daily wheel *i*, which imparts motion to the globe, and the end of this arbor should be square or of other polygonal form, to carry the globe with it.

The globe is prevented from sliding up and down on the axis by means of two collars, *m* *m′*, placed one within and one without the globe on the shaft F′, and secured to it by set-screws.

The regulator, which is made on the usual plan, and the proposed means of operating it from without the globe are illustrated at Fig. 4. It is composed of a toothed sector, S, adjusted in the balance-wheel bridge and carrying the pins which control the hair-spring, the said sector having engaged with it a sector, *r*, which is made fast to the inner end of a sleeve or tube, *q*, arranged around and on the shaft F′ in such manner as to turn freely thereon, and that its outer end, which protrudes through the globe, may be taken hold of from without the globe.

Having thus described the different parts of the machine, I will proceed to describe its operation.

Supposing the globe to be stationary, by turning the thumb-piece G attached to arbor F′ the mainspring *b′* is wound up, and thus motion is imparted to the works, and through the arbor *o* of daily-wheel *i* to the globe, this arbor also carrying the hour-hand and the latter indicating the hour on the dial D, while the minute-hand on the arbor *p* indicates the minutes on the same dial for local time. The globe is thus revolved diurnally.

To ascertain the time of day at any part of the globe—say Washington city—look at its meridian and see where it meets the equatorial dial B, which is also divided into hours and fractions of the same. The time of the day at Washington city and all other places on its meridian will be thus at once ascertained.

It will be seen that my time-globe illustrates to the pupil the diurnal revolution of the earth on its axis, causing the vicissitudes of day and night; also shows the relative time at any meridian; and, by means of the additional dial D, the instrument also renders the service of a common clock when not used for educational purposes.

It will be readily perceived that by turning the sleeve *q* the toothed sector *r* will impart motion to the regulating-sector S, producing the desired effect.

Having thus described my invention, what I claim as new, and desire to secure by Letters Patent of the United States, is—

1. In combination with the terrestrial globe A, provided with an internally-arranged chronometer-movement, substantially as described, a clock-dial located at or near one of the poles of the globe, all in substantially the manner and for the purpose set forth.

2. In combination with the globe and its contained clock mechanism, an axially-arranged shaft composed of two parts, F and F′, one of which serves as a stationary shaft, upon which may turn two concentrically-arranged sleeves that carry the hour and minute hands, and the other of which serves as the winding-arbor of the clock, as set forth.

3. The combination, with the globe and its contained clock mechanism, of a regulator arranged within the globe, as described, and means for operating the regulator from outside the globe, substantially in the manner hereinbefore described.

In witness whereof I have hereunto set my hand.

L. P. JUVET.

In presence of—
J. N. McINTIRE,
H. JANVIER.